Sept. 12, 1939.　　　G. M. BICUSA　　　2,172,931
FISHING DEVICE
Filed April 6, 1939　　　3 Sheets-Sheet 1
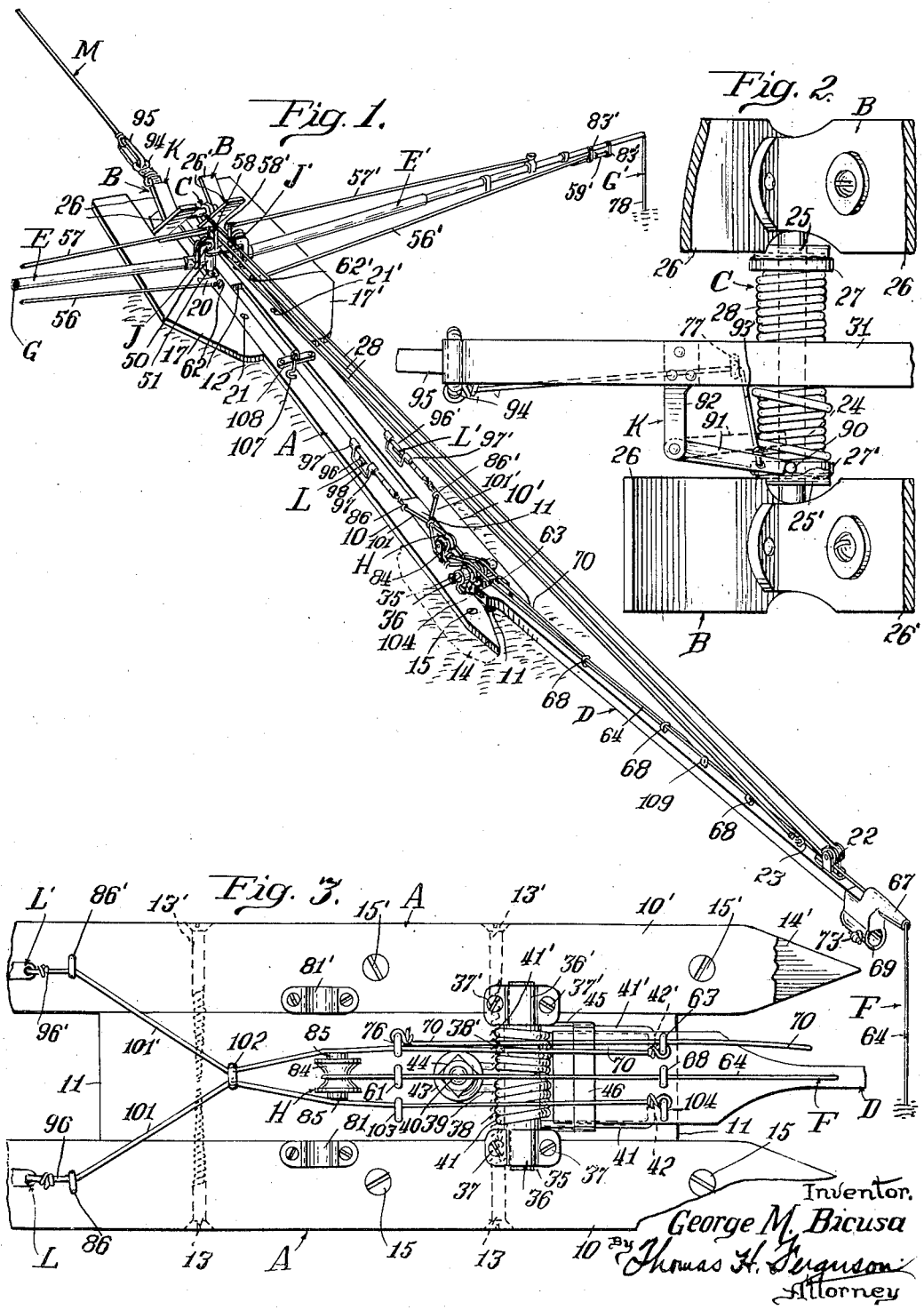

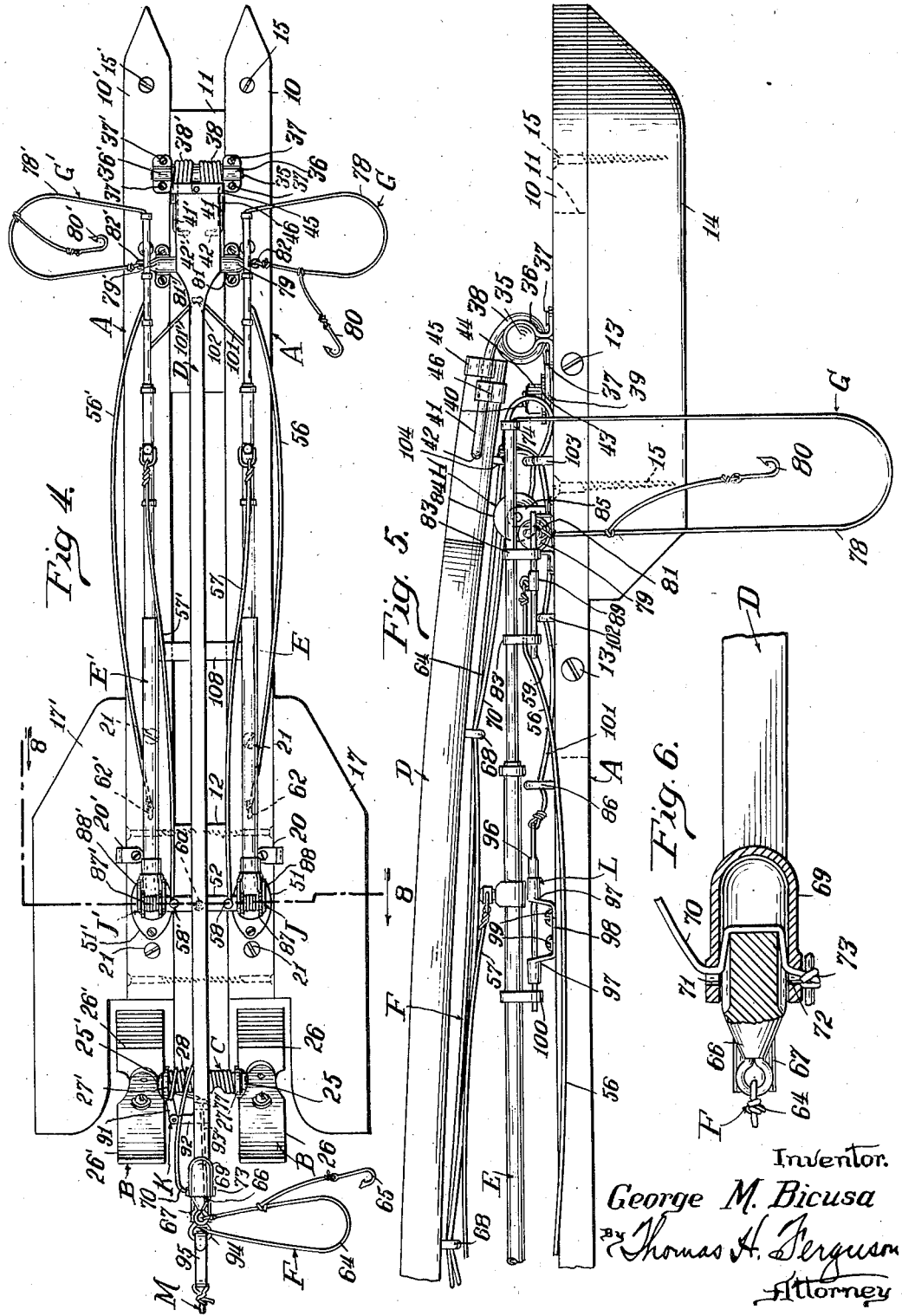

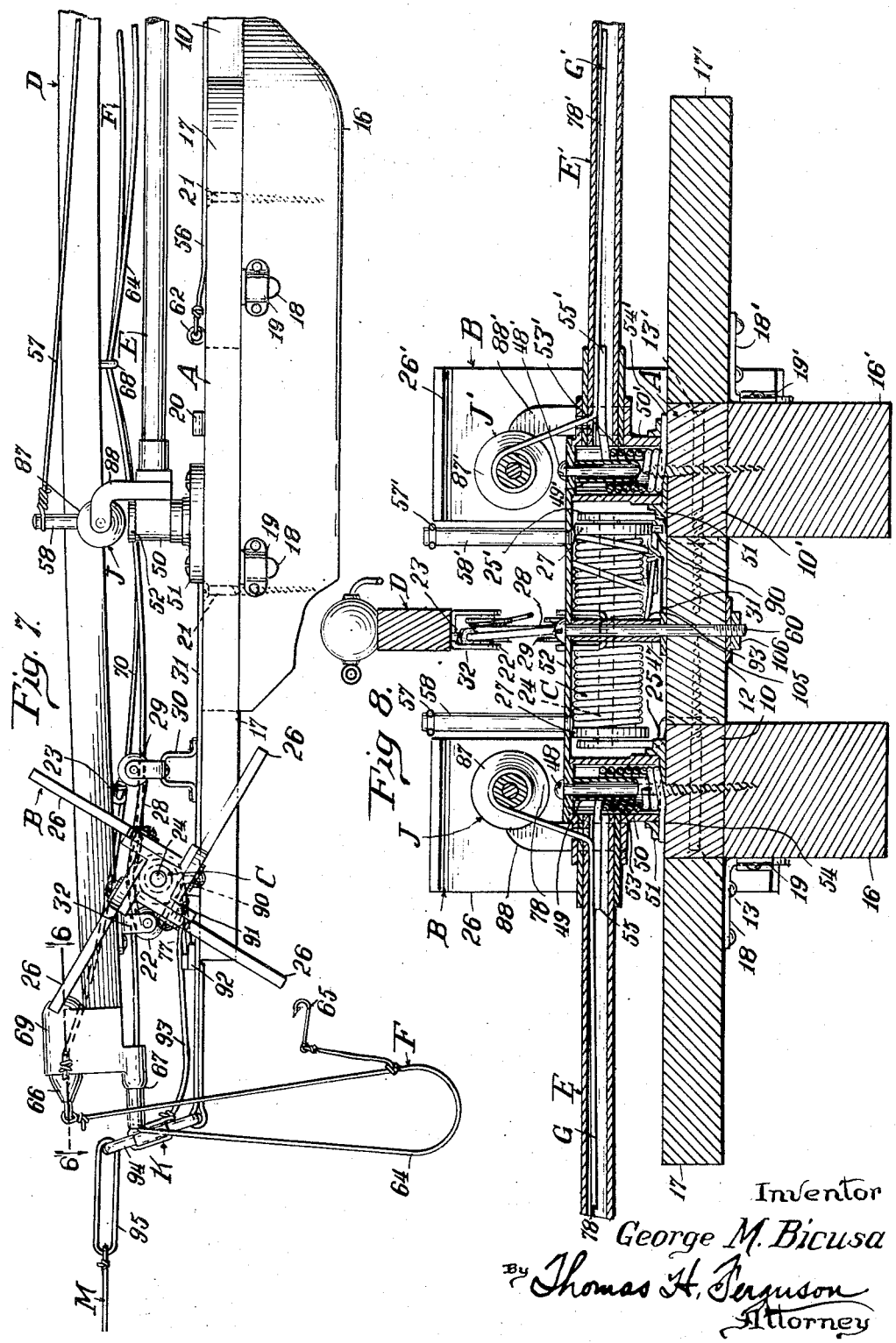

Patented Sept. 12, 1939

2,172,931

UNITED STATES PATENT OFFICE 2,172,931

FISHING DEVICE

George M. Bicusa, Melrose Park, Ill.

Application April 6, 1939, Serial No. 266,258

13 Claims. (Cl. 43—4)

The present invention relates to fishing devices and has for its principal object to produce a device which will convey fishing tackle out over the water to a definite point and there launch the tackle for service. In working out the device for this use several novel features have been devised which may be used alone or in conjunction with other features in different combinations as will be readily apparent.

In general the new device in its full embodiment includes a float which carries fishing rods and tackle which are normally in nested relation with the float but operate, when properly released, to project the rods to forward positions and thereupon in each instance release the associated tackle; a propeller operates to drive the float to the launching point; and a land line under the control of the user limits the advance of the float and serves to haul the device back to land again.

The various features and advantages of the invention will more fully appear upon consideration of the following detailed description taken in connection with the accompanying drawings which respectively describe and illustrate the preferred embodiment of the invention. For a measure of the invention reference should be had to the appended claims.

In said drawings Fig. 1 is a perspective view of a fishing device constructed and arranged in accordance with the present invention, the different fishing rods being shown distended and the tackle of each paid out. Fig. 2 is an underneath plan view of the catch mechanism by which the main rod is held in place. Fig. 3 is a plan view of the forward portion of the float with the main rod extended, and the cable by which it is drawn omitted for clearness. Fig. 4 is a plan view of the device with the different rods nested upon the float. Fig. 5 is a side elevation of the forward portion of the device with the rods in nested position. Fig. 6 is a sectional view taken at the free end of the main rod, the plane of section being indicated by the line 6—6 of Fig. 7. Fig. 7 is a side elevation of the rear or stern portion of the device showing the rods in nested position. And Fig. 8 is a transverse sectional view taken on the plane indicated by the line 8—8 of Fig. 4. Throughout these views like characters refer to like parts.

In brief, the complete device comprises a float A, a propeller B, a propeller drum C, forward and lateral fishing rods D, E, E', associated tackles F, G, G', and reels H, J, J', catch mechanism K for holding the main rod D in nested position, latch mechanisms L, L' for holding the lateral rods E, E' in nested position, and M the land line for tripping the catch mechanism K and keeping the device in hand. In operation the float A is placed on the water with the parts nested and the fishing lines drawn in, then the line M is pulled to release the catch mechanism K; as a result of tripping this mechanism the rod D rotates about its pivot, its free end rising and moving forward and thus through a connecting cord unwinding the drum C to drive the propeller D, and thus advance the float; finally the rod D reaches its forward position and releases its tackle F and the latches L, L', the latter freeing the lateral rods E, E', and allowing them to move to their outward spread apart positions, whereupon these lateral rods release their tackles G, G'. When the device is drawn to land after use, the drum C is rewound and the reels H, J, J' are used to draw in the lines. The catch mechanism K and the latch mechanisms L, L' are again set to hold the rods in nested position upon the float. The device is then ready for a new like operation. Obviously, each time the float is sent out for actual fishing the hooks must be baited or the tackle otherwise prepared for the fish.

The float A is preferably composed of wood and is built up out of a number of pieces. As shown, it comprises two longitudinal strips 10, 10' which are spaced at the forward end by a short piece 11 and at the rear end by similar short piece 12. These spacing pieces are held to the long strips by any suitable means, such as screws 13, 13', any desired number being used for the purpose. At the forward end of the float, the strips 10, 10' are provided with block-like members 14, 14' which are of substantial size and therefore contribute considerably to the buoyancy of the device. These blocks 14, 14' are secured to the strips 10, 10' in any suitable way, preferably by screws 15, 15', of which, as before, there may be any desired number. At the rear of the float the strips 10, 10' are provided with similar blocks 16, 16' which are likewise preferably secured in place by screws 21, 21'. The blocks 14, 14', 16, 16' are upwardly and forwardly inclined at their forward ends and consequently serve as shoes or runners for the float as it is drawn along the ground. When in the water these blocks, being of substantial size, increase the buoyancy of the float, and they are pointed at their forward ends to facilitate the advance of the float under the driving action of the propeller B.

In order to meet the condition of rough water,

I have provided lateral wings 17, 17' located near the stern of the float. These wings are composed of wood and may be used or not as desired. They are removable. Thus, the wing 17 is provided on its under side with metal angle plates 18 located in spaced relation along its inner edge. Each of these plates has a flat portion and a downwardly projecting portion. By the former it is secured to the under side of the wing near its inner edge, and by the latter, which constitutes a fastening blade or tongue, it is removably secured to the face of the adjacent block 16 of the float through the agency of a keeper 19. The latter takes the form of a strap of metal which is secured at its ends to the block and provided at its center with a space or socket into which the tongue of the member 18 is adapted to enter. On the upper side of the strip 10, adjacent to its outer edge, is a retaining button 20 which is pivoted upon the strip 10 and adapted to extend over a portion of the adjacent wing 17 to hold the latter down in place when the parts are assembled. Similar provision is made for removably securing the wing 17' to the block 16' and the strip 10' upon the opposite side of the float. The tongue member 18', the keeper 19' and the button 20' perform the functions in the latter case. Obviously, in service these projecting wings tend to maintain the float right side up whenever the water is rough.

The propeller B which is used in advancing the float is located at the stern and operates as a stern paddle wheel. It has a main shaft 24 which is mounted to rotate in bearings 25, 25'. These bearings are suitably formed plates apertured for the passage of the shaft and secured on the outer edges of the rear spacing block 12 which, it will be noted, extends a short distance beyond the rear ends of the strips 10, 10' of the float. The propeller has upon its opposite ends a plurality of paddles 26, 26'. In this instance there are four such paddles at each end of the shaft 24. It will be obvious that when the shaft is rotated the paddles will also rotate and they are positioned so as to enter the water and press upon it so as to propel the float so long as the turning of the shaft continues.

The drum C is located directly upon the shaft 24 and is in the form of a spool having disk-like ends 27, 27'. This drum is secured to the shaft 24 and rotates with it. In association with the drum is a line or cable 28 which is adapted to be wound up upon the drum in preparation for the operation of the device. In other words, by turning the propeller in the right direction the line 28 may be wound up upon the drum C. The line 28, as clearly shown, extends from the drum up to and over the guide pulley 22 located near the outer end of the rod D, thence to and around the guide pulley 29 upon the float, and thence on upward to a point near the outer end of rod D where it is secured to a screw eye 23, positioned just inward of the pulley 22. In this way the drum line is connected with the free end of the main rod D. When the drum is wound up so as to draw in on the line 28, then the free end of the rod D is drawn downward toward the drum.

By reason of the line 28 passing as it does from the drum to the end of the rod and then back to the drum and again out to the end of the rod, three times the length of the line from the drum to the rod end is unwound from the drum before the rod comes to rest in its outward position. Thus, the power exerted by the rod D in turning the drum and the paddle wheels multiplies the turns given to the wheels by three over what would occur were but a single stretch of line used between the drum and rod end. This multiplying of the length of the line increases the range of travel of the float for each full unwinding of the drum under the pull of the pole D.

The pulley 29 is carried by a supporting member 30 which is secured to a plate 31 which extends along the upper face of the spacing block 12 and is suitably secured thereto. Likewise, the pulley 22 is carried upon a supporting member 32 which is firmly secured to the rod D. As we shall see later, the drum, when in its fully wound position, is held in place by the catch mechanism K.

The main rod D is preferably composed of wood or metal. As shown, it is composed of wood and is pivoted at its base to the forward end of the float. The rod D is about the same length as the float so that when it is free and drawn down by the winding up of the cord 28 upon drum C, such free end will be adjacent to the stern of the float. The bearing for the rod D is provided by a transverse member 35 which is held at its opposite ends by standards 36, 36'. The standard 36 is preferably made out of a strip of metal which fits around the rod or bar 35 and terminates in flat ends, lying in the same plane, by which it may be secured to the adjacent portion of the float. Screws 37 may be used for this purpose. The member 36' is similar to the member 36 and is shaped and secured in the same way by screws 37'.

The bar 35 may be composed of metal or wood. It serves as a support for a coiled tension spring which is double in formation. Thus, on the one hand, there is a coil 38 and on the other hand, a coil 38'. The two coils are united by a length of the wire, out of which they are formed, being bent in U-shape, as indicated at 39, around a bolt 40. At its outer end the coil 38 terminates in a long straight portion 41 which is inturned at its outer end to form a projection 42 which enters an opening in the adjacent wall of the rod D. The coil 38' is similarly provided with a straight portion 41' and an inturned end 42' which is similarly secured to the rod D. The bolt 40 extends down through the space block 11 of the float and is provided at its upper end with a washer 43 and a nut 44. By screwing home the nut upon the bolt the looped portion 39 of the coiled structure is held firmly in place upon the float. The tension given the spring mechanism, comprising the coils 38, 38', is such as to tend to rotate the rod D forwardly. In other words, when the rod D is unrestrained, it will move to a forward position which may be limited in any desired way, as, for example, by the engagement of the base of the rod with the upper face of the forward end of the float. This means that when the rod is drawn to its backward position, wherein its free end lies near the drum C, the spring comprising the coils 38, 38' will be under considerable tension. As a result, whenever the catch mechanism K is operated to free the drum for unwinding rotation, the spring mechanism at the base of the rod D will cause the rod to pull upon the cord 28 and thereby rotate the drum and the associated paddles of the propeller and this rotation will be in a direction to cause the float to advance under the propelling action of the paddles when the device is in the water. The line 28 is of sufficient length to allow the rod D to move to its full forward position, wherein its outer end extends well beyond the bow of the float. Preferably, the limited length of the line 28 is not relied upon to stop the forward movement of the rod D but the latter is stopped by engaging the float itself. A strap 45 at the base of the rod D cooperates with an adjacent strap 46 to firmly secure the ends 41, 41' to the rod D, thus insuring a tight connection between the rod and the spring mechanism.

The lateral rods E and E' are similar in construction. The rod E may first be considered. This rod is pivotally secured to the float at a point adjacent to the stern of the float and the free end of the rod, when in nested position, extends to a point close to the pivotal support of the main rod D. The rod E is preferably composed of metal tubing at different sizes suitably secured together to form one continuous noncollapsible rod. At its pivoted end it is secured to a rotating sleeve 50 which is mounted in a lower bearing 51 and an upper bearing in the adjacent end of the transverse bar 52. A coiled spring 53 within the sleeve 50 has one end 54 passing through an opening in the bearing member 51 and its other end 55 into the interior of the rod E. A screw 48 passes through openings in the bar 52 and bearing 51 and is screwed home into the float member 10. A spacing sleeve 49 acting between the under side of the bar 52 and the upper side of the bearing 51 keeps these parts properly spaced so as not to bind the rotating sleeve 50 but on the contrary give it ample freedom for rotation. The spring 53 is placed under tension when the parts are thus assembled. Consequently, since both bearings 51 and 52 are fixed, it follows that the rod E will be rotated about its pivotal mounting whenever it is freed from its folded or nested position upon the float and latch mechanism L is employed to hold it in its nested position. When the latter is tripped the rod promptly moves out to its forward position projecting away from the float.

The outward movement of the rod E is limited by a cord 56 which is secured at its inner end to a screw eye 62 screwed into the float strip 10 at a point a little forward of the supporting bearing 51 and at its outer end a slidable pin 59 which has a limited movement under the pull upon the cord 56. When the pin 59 is drawn backward to its limit, the cord 56 becomes taut and thus limits the outward swinging movement of the rod E. The length of the cord 56 is such as to allow the rod E to move to a desired lateral position, such as indicated in Fig. 1. Obviously, if the cord 56 be shortened, the extent of movement of the rod will be more limited. Likewise, if the cord 56 be lengthened, the movement of the rod E will be greater. As part of the construction for maintaining the rod E in the proper relation to the float, and in order to remove strain from the pivotal connection provided by the bearing member 51, the rod is provided with a reinforcing member in the form of a guy wire 57 which is secured at one end to the rod E toward its outer end and at its other end to an upright 58 which is carried by the cross-bar 52 which forms the upper bearings of the two lateral rods. It will be seen that as the rod E moves outward away from the float, the wire 57 will be put under tension and assist in carrying the weight of the rod E. The transverse member 52 is preferably secured to the float not only by the screws near its ends but also by a central bolt 60 which passes down through a spacing tube 47 and thence through openings in the metal strip 31 and the member 12 of the float to a point beyond the latter where a suitable washer 105 and a suitable-retaining nut 106 may be applied.

Since the rod E' is constructed and mounted in the same way as the rod E it will not be necessary to describe that rod and its connections. It may be pointed out, however, that for convenience in distinguishing the two rods the corresponding parts have been similarly designated, but with the characters primed.

Coming now to the fishing tackle F, which is associated with the main rod D, it will be noted that the same consists of a fish line 64 provided with one or more fish hooks 65 and an associated sinker 66. The line 64 extends through a ferrule 67 located at the outer end of the rod D. From that point it passes back through guiding eyes 68 upon the rod D and a guiding eye 61 on the float to the reel H to which it has its end fastened. The line 64 is of such length that when it is fully paid out it will bring the hooks to the proper depth for fishing.

The sinker 66 normally rests in a socket member 69 is located just beneath the ferrule 67. When the line 64 is wound upon the reel so as to bring the sinker adjacent to the end of the rod D, then the sinker is placed within the socket member 69. This is the position it holds when the parts are set for operation. As shown more particularly in Fig. 6, the sinker 66 is associated with a trip line 70 which, when drawn up taut, will thrust the sinker 66 out of the socket member 69 far enough to allow the sinker to drop under the action of gravity, and thus draw the line 64 down under the water. As shown, the trip line 70 is passed through openings 71, 72 in opposite walls of the members 69, and on the one side is provided with a knot 73 so that it cannot be drawn through the opening 72. When the rod D is drawn back and the sinker 66 is placed in the member 69, the trip line 70 is loose enough to allow the sinker and line 70 to enter and occupy the positions illustrated in Fig. 6. The trip line 70 passes along through several of the eyes 68 upon the rod D to a point adjacent the spring coils 38, 38' near the base of the rod D. There it passes through an additional eye 63 and then on to eye 76 where it has its end secured. The eye 76 is secured to the float member 12, as clearly shown. The length of the trip line 70 is such that it will not be drawn taut until the free end of the rod D has been reached, or almost reached, its forward position. When this occurs, the sinker 66 will be thrust out of its holder 69 and the line 64 will be paid out into the water, as before stated.

When we come to the fishing tackle G and G' of the lateral rods E, E', we have again similar arrangements for both rods. Referring to the tackle G of the rod E, it will be seen that there is a fish line 78 that passes from the reel J through the interior of the rod, which is hollow, on out through its outer end, where it too is provided with a sinker 79 and one or more fish hooks 80. The sinker 79 is the same in shape as the sinker 66 and is provided with a similar end eye 82. The hooks 80 may be of any preferred construction. When the parts are in nested position, the sinker 79 rests in a saddle 81 secured to the top of the strip 10 of the float. As the rod E is freed and starts to move to its outward, or forward, position, it will drag the sinker 79 from its seat in the saddle 81 and by reason of the holding pin 59 extending through the eye 82 of the sinker, the only effect at first will be that the sinker will swing down about the pin 59 and hang thereon as the rod E moves outward. When it reaches a point near its outward traverse, the pull on the cord 56 will draw the pin 59 out of the eye 82 and drop the sinker 79 which will then pass down into the water and draw the line 78 along with it until the permitted length of the line is paid out. As before, the line must be made of such length that it will reach the proper depth for fishing. The inner end of the line must obviously be secured to the reel J. Likewise, the catch pin 59 may be variously mounted for sliding. In the present instance it is shown passing through the two guide members 83, which are secured to the rod E toward its outer end. The cord 56 is secured to the pin 59 at an intermediate point through the agency of a collar 89 fixed to the pin. When in its outer position the pin 59 projects sufficiently to hold and carry the sinker 79 when freed from its saddle. When drawn back, the block 89 engages the inner guide 83 and at the same time frees the sinker 79. When the inner guide is thus engaged, the cord 56 may be drawn taut. Since the tackle G' and associated trip pin, associated with the rod E', are the same as just described, it will suffice to designate the corresponding parts with similar numerals primed, just as was done before.

The reel H may be of any desired construction. In the present instance it is shown as a simple drum 84 journaled in suitable bearings formed in standards 85 projecting above the float and secured at their lower ends to the spacing block 11 of the float. Obviously, the reel may be provided with a crank or otherwise arranged so as to provide for the easy winding up of the line 64 of the tackle F.

When it comes to the reels J, J', the same may be constructed and mounted in any desired way. In the present instance the reel J includes a drum 87 journaled between bearing member 66 which are secured to the sleeve member 50 of the associated rod mounting. The reel J', associated with the rod E', has similar parts, similarly designated with primed numerals. Obviously, the reels J, J' may be provided with cranks or otherwise operated to wind up the associated fishing lines, just as in the case of reel H, previously mentioned.

Coming now to the catch mechanism K, it will be noted that the end 27' of the drum C is provided with a radially projected pin 90. This pin cooperates with a movable arm 91 which is pivotally mounted at the outer end of a fixed arm 92 which in turn is secured to the strip 31 mounted upon the block 12 of the float. Obviously, when the arm 91, which is a stop arm, is in position to engage the pin 90 the drum C will be held against rotation by reason of any pull upon the line 28. However, if the arm 91 be moved to the dotted line position, as the parts are shown in Fig. 2, then there will be no obstruction to the pin 90, and the drum will be free to rotate under the pull of the line 28 unless, of course, the propeller be held against rotation, by hand or otherwise.

In operation, the flat is first placed in the water with the drum C held against rotation by the stop arm 91 engaging the pin 90. When ready to start the device, the drum is freed by swinging the end of the arm 91 away from the path of travel of the pin 90. This movement of the arm 91 is brought about through a flexible cord 93 which is secured at one end to the arm 91 near its free end and after passing through a guiding eye 77 upon the strip 31, extends, and is secured, to a rock arm 94 which is pivoted at its lower end to the rear end of the strip 31 which is folded back upon itself, as clearly shown in Fig. 7, to provide at its rear end a bearing for the lower end of a member 94. Obviously, a backward pull upon the upper end of the member 94 will act through and by the cord 93 to move the stop member 97 out of pin-engaging position and thereupon the drum will be free to rotate under the pull of the cord 28, occasioned by the upward and forward travel of the rod D to drive the propeller B.

It may be here pointed out that the free end of the member 94 is provided with a link 95 to which the end of the rehaul or land-line is attached. Thus, it follows that when the float is placed in the water with the catch mechanism in place to hold the drum, then the device will not be advanced by the propeller B until the catch mechanism K is moved to open position. This means that when the user is ready, he may pull on the land line M and thus start the device on its forward journey. Obviously the line M may be of any desired length. Commonly a line some 200 or 300 feet in length is employed.

The latch mechanism L and L' are similar in construction and a description of one should suffice for both. With the latch mechanism L in mind, it will be observed that the same includes a pin 96 which is free to pass back and forth longitudinally within fixed guide bearings 97 formed at the ends of a strip 98 secured to the float strip 10 by screws 99 or other suitable means. This pin passes into and out of an opening in a depending arm 100 secured to the under side of the rod E. Oviously, when the pin 96 is withdrawn from the opening in the arm 100 the rod E will be free to move outward from the float and drag its fishing tackle with it, as before explained. The latch mechanism L' is of similar construction and is similarly designated by like characters primed.

In order to actuate the pins 96, 96', there are provided cords 101, 101' which extend respectively from the pins 96, 96' through guiding eyes 86, 86', thence through a common eye 102, then dividing, going through eyes 103 and 76 respectively and on to eyes 104 and 63 respectively, to which eyes 104 and 63, the ends of the cords 100, 101 are respectively secured. It will be noted that the eyes 103 and 76 are upon the float while the eyes 104 and 63 are upon the rod D near its base. Hence when the rod D moves forward, it will pull upon the cords 101, 101' to move the pins 96, 96' from their rod-holding positions. Obviously, the lengths of the cords 101, 101' must be such as to free the pins when the rod has just about reached its foremost position. Ordinarily, the pins 96, 96' disengage their respective rods at the same time, and thus both lateral rods move outward at the same time. This coincident operation, however, is not necessary and one line might be made a little longer than the other with resulting successive operations.

When carrying the device the poles D, E, E' are preferably in nested position adjacent to the float. When so positioned, the part may be held against displacement by means of a hook 107 which is fixed to a short bar 108 extending between the float members 10 and 10' at a suitable point near the stern of the float. The free end of the hook cooperates with a screw eye 109 upon the rod D to hold the latter in its backward or nested position.

Obviously, in carrying out my invention certain alterations and modifications may be made in the structure disclosed without departing from the spirit and scope of the invention. It is aimed therefore to cover such alterations and modifications as rightly come within the purview of the invention by the term of the appended claims.

I claim:

1. A fishing device comprising a float, propelling means for advancing said float through the water, fishing tackle carried by said float, spring actuated means for driving said propelling means, and means operative only when said spring actuated means has substantially completed its float advancing operation, to free said tackle from said float.

2. A fishing device comprising a float, a propeller having paddles for advancing said float, a rod pivotally mounted on said float and having a free end movable upward away from said float, a drum operatively connected to drive said propeller, a cord secured to said rod near its free end and passing into operative engagement with said drum so as to be wound up thereon to draw the rod down toward said float, spring means tending to rock said rod about its pivot away from said float, means for holding said drum against unwinding rotation, means for tripping said drum-holding means to free the parts to advance the float, fishing tackle carried by said float, means for holding said tackle against release, and means responsive to the movement of said rod to release said tackle-holding means.

3. A fishing device comprising a support, a rod pivotally mounted on said support, spring means operative when unhindered to rock said rod to a forward position, means for holding said rod in a backward position with said spring means under tension, means for releasing said holding means to free said rod to allow the same to advance to its forward position, a reel, a fishing line passing from said reel along said rod to its outer end, a hook and sinker secured to the outer end of said line, means for retaining the same against paying out movement until said rod reaches its forward position, and means operative when said forward position is reached to free said sinker and thus allow the same to draw said line outward.

4. A fishing device comprising a support, two rods pivotally mounted on said support, spring means associated with each of said rods operative when unhindered to move its rod to a forward position, means for holding each of said rods in a backward position with its said spring means under tension, means for releasing the said holding means of one of said rods to free it for advance to its forward position, means responsive to the travel of said advancing rod to free the other of said rods for advance to its forward position, suitably weighted and otherwise equipped fishing lines carried by said rods and operative to be fed outward therefrom, and means for freeing said lines when said rods reach their forward positions respectively.

5. A fishing device comprising a support, a main rod and an auxiliary rod, both of said rods being pivotally mounted on said support, spring means associated with each of said rods and operative to move said rod to a forward position, means for holding said main rod in a backward position with its spring means under tension, other means for holding said auxiliary rod in a backward position with its spring means under tension, manually operated means for tripping said first mentioned holding means to free said main rod to allow the same to advance to its forward position, means responsive to the travel of said main rod to disengage said other holding means to free said auxiliary rod to allow the same to advance to its forward position, reels associated respectively with said rods, a fishing line passing from each of said reels along the associated rod to its outer end, a hook and sinker connected to the outer end of each of said lines, means associated with each of said rods for retaining the associated line against paying out movement until its rod reaches its forward position, and means for freeing said respective retaining means when said rods respectively reach their forward positions.

6. A fishing device comprising a support, a rod pivotally mounted on said support at one point, spring means operative when unhindered to move said rod about its pivot to a forward position, a drum rotatably mounted on said support at a point adjacent to that occupied by the free end of said rod when in its backward position, a cord secured to said rod and passing into operative engagement with said drum so as to be wound up thereon to draw said rod to its backward position and to unwind therefrom as said rod moves toward its forward position, catch mechanism for holding said drum against unwinding, means for releasing said catch mechanism to free said rod for travel to its forward position, a reel, a fishing line passing from said reel along said rod to its outer end, a hook and sinker secured to the outer end of said line, means for retaining the same against paying out movement until said rod reaches its forward position, and means operative when said forward position is reached to free said sinker and thus allow the same to draw said line outward.

7. A fishing device comprising an elongated support, a main rod pivotally mounted on said support so as to be movable from a backward position in nested relation with said support to a forward position extending beyond the end of the same, an auxiliary rod pivotally mounted on said support so as to be movable laterally from a backward position in nested relation with said support to a forward position extending outward from one side of said support, spring means associated with said rods and being operative when unhindered to move said rods to their forward positions respectively, a drum rotatably mounted on said support at a point adjacent to the free end of said main rod when the latter is in its nested position, a cord secured to said main rod and passing into operative engagement with said drum so as to be wound up thereon to draw said main rod to its nested position and to unwind therefrom as said rod moves towards its forward position, catch mechanism for holding said drum against unwinding, means for releasing said catch mechanism to free said main rod for travel to its forward position, latch mechanism for holding said auxiliary rod in its nested position, means responsive to the travel of said main rod to its forward position to release said latch mechanism to free said auxiliary rod to allow the same to move to its forward position, reels associated with said main and auxiliary rods respectively, suitably weighted and equipped fishing lines passing from said reels to the outer ends of said main and auxiliary rods respectively, and operative to be fed therefrom, and means for freeing said lines for such feeding when said rods reach their forward positions.

8. A fishing device comprising an elongated float, a rod pivotally mounted on said float near its forward end and operative to be moved from a backward position in nested relation with said float to a forward position in which it extends beyond the bow of said float, spring means operative when unhindered to move said rod about its pivot to its forward position, a drum rotatably mounted on said float near its stern in position to closely approach the free end of said rod when in its nested position, a propelling wheel at the stern of said float having paddles operative in response to the unwinding rotation of said drum to advance said float when placed upon the surface of a body of water, a cord secured to said rod and passing into operative engagement with said drum so as to be wound up thereon to draw said rod to its backward position and thus place its spring means under tension and to unwind therefrom as said rod moves forwardly, thereby driving said paddle wheel to advance said float, catch mechanism for holding said drum against unwinding, means for releasing said catch mechanism to allow said rod and float to advance, a reel, a suitably weighted and equipped fishing line passing from said reel to the outer end of said rod to be fed therefrom, and means for freeing said line for such feeding when said rod reaches its forward position.

9. A fishing device comprising an elongated float, a main rod pivotally mounted on said float near its forward end and operable to move from a backward position in nested relation with said float to a forward position in which it extends beyond the bow of the float, an auxiliary rod pivotally mounted on said float in location to be removable from a backward position in nested relation with said float to a forward position in which it extends outward from one side of said float, spring means associated with said rods and operative when unhindered to move said rods to their forward positions respectively, a drum rotatably mounted on said float near its stern in position to closely approach the free end of said main rod when it is in its nested position, a propelling wheel at the stern of said float having paddles operative in response to the unwinding rotation of said drum to advance said float when placed upon the surface of a body of water, a cord secured to said rod and passing into operative engagement with said drum so as to be wound up thereon to draw said main rod to its backward position and thus place its spring means under tension and to unwind therefrom as said rod moves forwardly, thereby driving said paddle wheel to advance said float, catch mechanism for holding said drum against unwinding, means for releasing said catch mechanism to allow said rod and float to advance, latch mechanism for holding said auxiliary rod in its nested position, means responsive to the advance of said main rod to its forward position to release said latch mechanism to allow the advance of said auxiliary rod to its extended position, reels associated with said main and auxiliary rods respectively, suitably weighted and equipped fishing lines passing from said reels to the outer ends of said main and auxiliary rods respectively, and operative to be fed therefrom, and means for freeing said lines for such feeding when said rods reach their forward positions.

10. A fishing device comprising a support, a rod pivotally mounted on said support, spring means operative when unhindered to rock said rod to a forward position, means for holding said rod in a backward position with said spring means under tension, means for releasing said holding means to free said rod for forward movement, fishing tackle upon said rod, means for retaining said tackle against paying out movement, and means for releasing said retaining means when said rod reaches its forward position.

11. A fishing device comprising a float, propelling means for advancing said float through the water, a rod pivotally mounted upon said float, spring means associated with the mounting of said rod and operative when unhindered to rock said rod to a forward position, means for holding said rod in a backward position with said spring means under tension, means for releasing said holding means to free said rod for forward movement, means actuated by the forward movement of said rod to drive said propelling means to advance said float, fishing tackle upon said rod, means for retaining said tackle against paying out movement, and means for releasing said retaining means when said rod reaches its forward position.

12. A fishing device comprising a float, propelling means for advancing said float through the water, a rod pivotally mounted upon said float, spring means associated with the mounting of said rod and operative when unhindered to rock said rod to a forward position, means for holding said rod in a backward position with said spring means under tension, means for releasing said holding means to free said rod for forward movement, a drum operatively related to said propelling means to drive the same, a cord adapted to be wound upon said drum as said rod is moved backward and to be drawn from the drum by the spring actuated rod, when the latter is free and moves forward, to drive said drum and propelling means to advance said float, fishing tackle upon said rod, means for retaining said tackle against paying out movement, and means for releasing said retaining means when said rod reaches its forward position.

13. A fishing device comprising a float, a propeller for advancing said float, a rod pivotally mounted on said float and having a free end movable upward away from said float, a drum operatively connected to drive said propeller, a cord secured to said rod near its free end and passing into operative engagement with said drum so as to be wound up thereon to draw the rod down toward said float, spring means tending to rock said rod about its pivot away from said float, means for holding said drum against unwinding rotation, means for tripping said drum-holding means to free the parts to advance the float, fishing tackle carried by said float, means for holding said tackle against release during the greater portion of the travel of said rod to its fully extended position, and means operative to release said holding means only when said rod has substantially completed its said travel.

GEORGE M. BICUSA.

CERTIFICATE OF CORRECTION.

Patent No. 2,172,931. September 12, 1939.

GEORGE M. BICUSA.

It is hereby certified that error appears in the printed specification of the above numbered patent requiring correction as follows: Page 3, first column, line 21, for the article "the" before "transverse" read a; line 23, for "through" read into; line 46, after "end" insert to; and second column, line 24, strike out "is"; line 52, strike out "been"; page 4, first column, line 67, for "flat" read float; and second column, line 9, for "member 97" read member 91; line 41, for "Tthe" read The; and that the said Letters Patent should be read with this correction therein that the same may conform to the record of the case in the Patent Office.

Signed and sealed this 23rd day of January, A. D. 1940.

(Seal)

Henry Van Arsdale,
Acting Commissioner of Patents.